United States Patent
Barbaza

(10) Patent No.: US 9,052,241 B2
(45) Date of Patent: Jun. 9, 2015

(54) METHOD FOR DETERMINING THE TEMPERATURE OF AN IGNITION COIL

(75) Inventor: Guy Barbaza, Fenouillet (FR)

(73) Assignee: CONTINENTAL AUTOMOTIVE FRANCE, Toulouse (FR)

( * ) Notice: Subject to any disclaimer, the term of this patent is extended or adjusted under 35 U.S.C. 154(b) by 205 days.

(21) Appl. No.: 13/990,461

(22) PCT Filed: Nov. 30, 2011

(86) PCT No.: PCT/EP2011/006009
§ 371 (c)(1),
(2), (4) Date: May 30, 2013

(87) PCT Pub. No.: WO2012/072252
PCT Pub. Date: Jun. 7, 2012

(65) Prior Publication Data
US 2013/0253800 A1 Sep. 26, 2013

(30) Foreign Application Priority Data

Dec. 1, 2010 (FR) ...................................... 10 04679

(51) Int. Cl.
*G01K 7/16* (2006.01)
*F02P 3/04* (2006.01)
*F02D 41/20* (2006.01)

(52) U.S. Cl.
CPC .......... *G01K 7/16* (2013.01); *F02D 2041/2065* (2013.01); *F02P 3/0435* (2013.01)

(58) Field of Classification Search
CPC . F02D 2041/2065; F02P 3/0435; G01K 7/16; H01L 2924/13055; H01L 2924/13091
See application file for complete search history.

(56) References Cited

U.S. PATENT DOCUMENTS

| 7,131,435 B2 | 11/2006 | Iwatsuki et al. |
| 2004/0011342 A1 | 1/2004 | Fukatsu |

(Continued)

FOREIGN PATENT DOCUMENTS

| DE | 10 2005 008458 | 8/2006 |
| DE | 10 2006 015351 | 10/2007 |

OTHER PUBLICATIONS

International Search Report dated Dec. 22, 2011, corresponding to PCT/EP2011/006009.

*Primary Examiner* — Stephen K Cronin
*Assistant Examiner* — Elizabeth Hadley
(74) *Attorney, Agent, or Firm* — Young & Thompson

(57) ABSTRACT

A method for determining the temperature of an ignition coil (1), including a primary winding with a winding resistance (Rp), the primary winding being controlled by a control stage (2) with a foot resistance (Rsh), the method including the following steps:
a) controlling the control stage in order to establish a primary control current;
b) waiting for a predetermined time;
c) determining the current Ip by measuring the voltage Vshunt and by dividing this voltage by the foot resistance Rsh;
d) acquiring the value of the supply VB and the voltage Vice;
e) determining the winding resistance Rp using the formula:

$$Rp = \frac{VB - Vce}{Ip} - Rsh$$

f) determining the primary winding temperature using a temperature-resistance correspondence curve.

11 Claims, 2 Drawing Sheets

(56) References Cited

U.S. PATENT DOCUMENTS

| | | |
|---|---|---|
| 2005/0045165 A1 | 3/2005 | Iwatsuki et al. |
| 2005/0133318 A1* | 6/2005 | Fedders et al. .............. 188/267.2 |
| 2007/0268023 A1* | 11/2007 | Dooley ......................... 324/546 |
| 2009/0241872 A1* | 10/2009 | Wang et al. ................ 123/90.11 |
| 2010/0030510 A1* | 2/2010 | Koehler et al. ............... 702/133 |
| 2010/0176759 A1 | 7/2010 | North |

* cited by examiner

METHOD FOR DETERMINING THE TEMPERATURE OF AN IGNITION COIL

FIELD OF THE INVENTION

The present invention relates to engine ignition devices for motor vehicles. It concerns more particularly a method for determining the temperature of an ignition coil.

BACKGROUND OF THE INVENTION

Methods for determining the temperature of an ignition coil are known in the prior art. Document U.S. Pat. No. 7,131,435 proposes a method based on analytical calculations involving the temperature of the cooling circuit, the engine speed and previous estimations of the coil temperature.

SUMMARY OF THE INVENTION

The objective of the present invention is to improve the reliability of determining the temperature of an ignition coil.

The invention proposes a method for determining the temperature of at least one engine ignition coil for a motor vehicle, said coil comprising a primary winding with a winding resistance and an inductance, said primary winding being controlled by a control stage with a switch and a foot resistance, the method comprising the following steps:
a) controlling the control stage in order to establish a primary control current across said primary winding under a supply VB;
b) waiting for a predetermined time;
c) determining the current Ip by measuring the voltage Vshunt at the terminals of the foot resistance and by dividing this voltage by the resistance of the foot resistance Rsh;
d) acquiring the value of the supply voltage VB and the voltage Vice at the terminals of the switch;
e) determining the winding resistance Rp using the formula:

$$Rp = \frac{VB - Vce}{Ip} - Rsh$$

f) determining the temperature of the primary winding using a correspondence curve CoilTemp=g(Rp).

By virtue of these measures, the determination is more direct and the reliability of the determination can be improved. Good knowledge of the temperature of the coil makes it possible, in particular, to optimise the conduction time and the thermal protection of the coil.

In various embodiments of the invention, it is also possible to use, if necessary, one and/or another of the following measures:
  step d) comprises a step of actual measurement of the value of the supply voltage VB;
  during step b), the predetermined time is a function of the voltage VB;
  during step b), the predetermined time is, in addition, a function of the temperature of the coil established beforehand;
  said method is applied at most once per minute;
  said method is applied following a periodicity depending upon the phase of operation of the engine;
  during an injection cut-off phase, the method is applied following a periodicity with a period longer than one minute;
  the method is consecutively applied to a multiple-spark explosion ignition sequence.

The invention also concerns a control unit suitable for controlling an engine ignition coil of a motor vehicle, said coil comprising a primary winding, the control unit comprising a control stage with a switch and a foot resistance, the control unit being suitable for implementing a method as described above.

BRIEF DESCRIPTION OF THE DRAWINGS

Other aspects, purposes and advantages of the invention will appear when reading the following description of an embodiment of the invention, given as a non-limiting example. The invention will also be better understood in relation to the enclosed drawings where.

The same references designate identical or similar elements in the various figures.

DETAILED DESCRIPTION OF THE INVENTION

Figure 1:
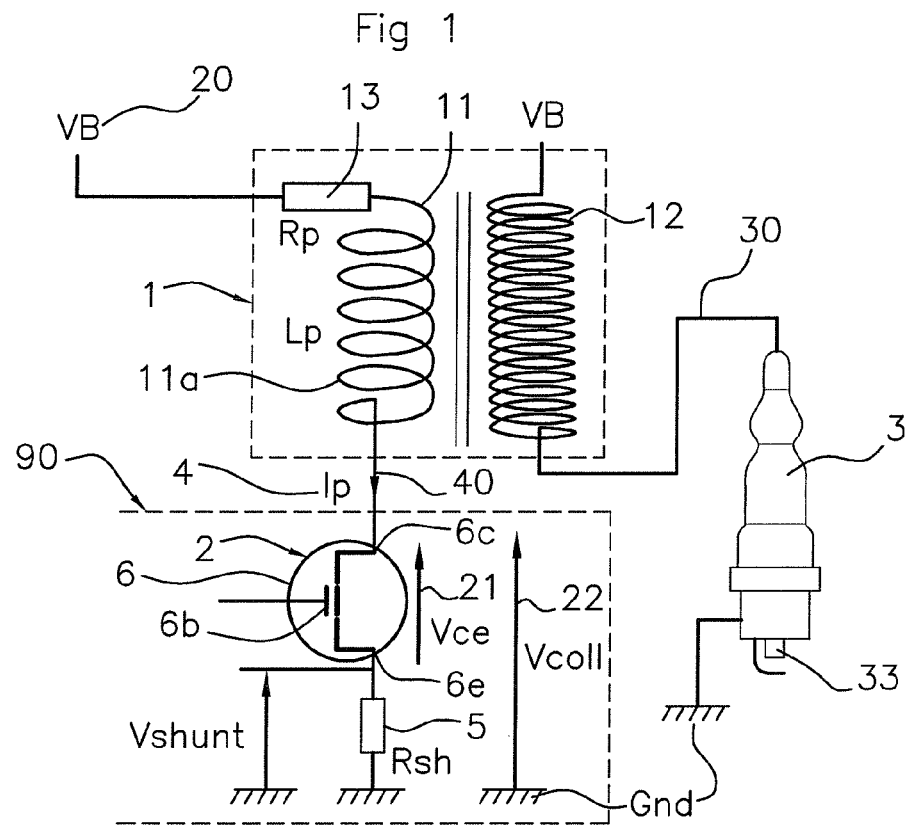
FIG. 1 shows the diagram including a coil and a control circuit suitable for the implementation of the method according to the invention.

FIG. 1 shows a diagram representing a system suitable for the implementation of the method according to the invention. In the diagram, the system includes a coil 1, a spark plug 3, and a control circuit 2 with a transistor 6, the whole being electrically supplied by a positive supply voltage VB and a ground Gnd. The transistor 6 can be any semiconductor switch 6 known as a field effect transistor or an IGBT (Insulated Gate Bipolar Transistor).

The control stage 2 can be e.g. integrated into a control unit such as an engine control computer 90 (partially shown in FIG. 1). The control stage 2 is connected to the input of the coil 1 via a conductive wire 40, and the output of the coil 1 is linked to the spark plug 3 via a conductor 30.

The coil 1 comprises a primary winding 11 and a secondary winding 12, the two windings being magnetically coupled to each other. The primary winding 11 comprises a conductor 11a with a resistance Rp and an inductance Lp, allowing a primary current Ip to circulate in this conductor. The resistance Rp is represented in FIG. 1 by a discrete element 13, but this resistance is actually distributed along the conductor 11a. The conductor 11a of the primary winding is connected at one end to the supply VB and at the other end to the collector 6c (or drain) of the transistor 6 of the control stage 2. Moreover, the emitter 6e (or source) of the transistor 6 is connected to a foot resistance Rsh (called a shunt due to the low resistance thereof) which is, in addition, connected to the ground Gnd, and crossed by the primary current Ip.

The transistor 6 comprises a base 6b (or gate) controlled following a suitable timing sequence by a microcontroller included in the already mentioned computer 90.

The secondary winding 12 is connected to the voltage supply VB and to the spark plug 3 via the conductor 30. The spark plug 3 has the base thereof connected to the ground Gnd and the electrode thereof connected to the conductor 30, an ignition spark being generated at the electrode 33 each time that the control circuit 2 interrupts the primary current Ip (reference 4).

Figure 4:
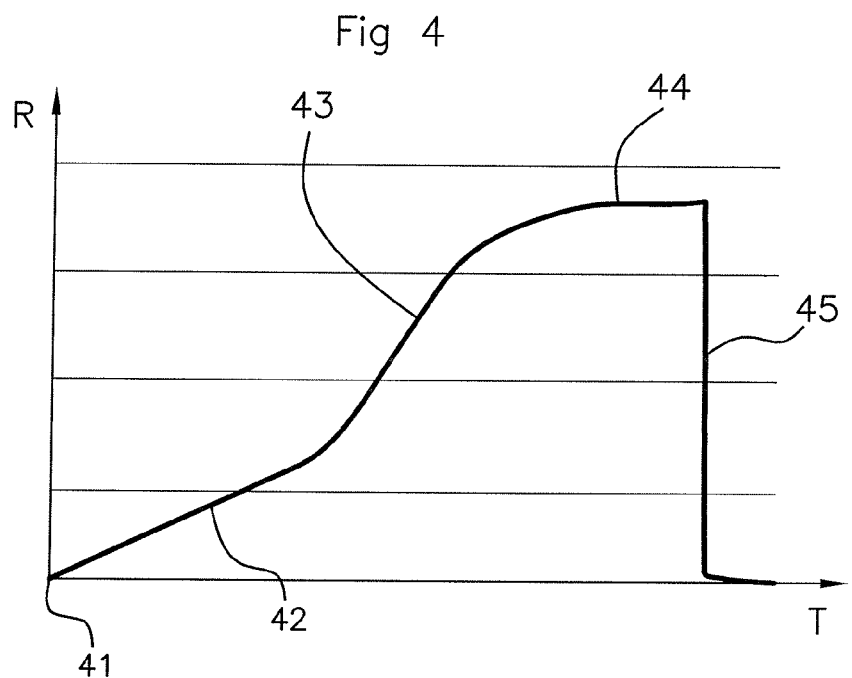
FIG. 4 shows a digital timing diagram of the primary current across the coil.

According to the advantageous method disclosed here, the following steps are performed:

Step a): the control circuit 2 is switched to the passing state "ON" to establish a primary control current Ip across said primary winding 11. In FIG. 4, which represents a digital timing diagram of the primary current Ip across the coil, at the beginning of the command 41, the primary current Ip is at the 0 value, then slowly increases 42 due to the effect of the inductance Lp; since the inductances varies with the current, the primary current Ip increases more rapidly afterwards (ramp 43), then reaches a plateau 44 during which the inductance has stored the maximum of energy. The equation governing the voltages VB (reference 20), Vcoll (reference 22) with respect to the current Ip and to the resistance Rp and inductance Lp is the following:

$$VB = Rp \cdot Ip + Lp \cdot \frac{dIp}{dt} + Vcoll$$

Step b): waiting for a predetermined time. This predetermined time, called "long dwell" can be a predefined parameter in the computer calibration and can also, if needed, be a function of the voltage VB, following an affine function. This predetermined time can also be a function of the previously established temperature of the coil.

To evaluate the resistance Rp, the system waits until the current is stabilized (plateau 44) so that the term dIp/dt cancels, which actually happens in case of a long dwell time. In these conditions, the following equation results:

$$VB = Rp \cdot Ip + Vcoll$$

Written differently, we have:

$$Rp = \frac{VB - Vcoll}{Ip} = \frac{VB - (Vce + Ip \cdot Rsh)}{Ip} \quad [1]$$

Or else:

$$Rp = \frac{VB - Vce}{Ip} - Rsh \quad [2]$$

Step c): Ip is deduced from the equality Ip=Vshunt/Rsh, Rsh being known and the voltage at the terminals of the foot resistance Vshunt being measured.

Step d): In addition, Vce is a known feature of the switch 6; similarly, VB can be known from a calibration table or measured in real time.

Step e): Thus, using equation [2], the value of Rp can be calculated as a function of VB, Vce, Ip and Rsh.

Figure 2:
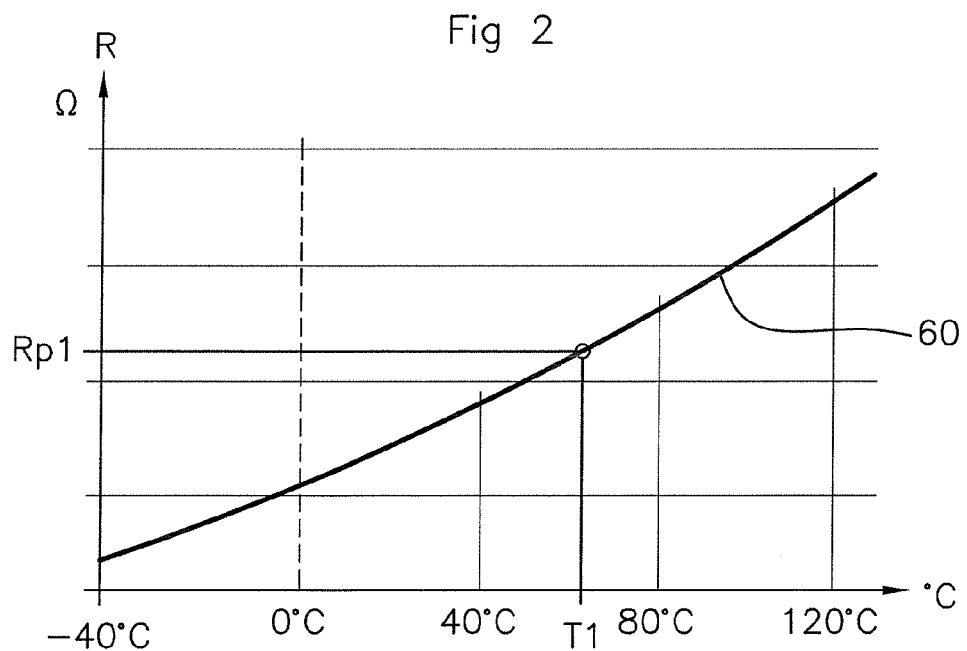
FIG. 2 shows a temperature-resistance correspondence curve.

We look then at a CoilTemp=g(Rp) correspondence curve, shown in FIG. 2. This correspondence curve [coil temperature (CoilTemp)] as a function of the resistance thereof can be written as CoilTemp=g(Rp) or Rp=f(CoilTemp) (cf. FIG. 2), f and g being the inverse of each other. The curve Rp=f(CoilTemp) 60 is deduced from prior characterization measurements, taken in the laboratory, which establish the dependency of the resistance of the primary conductor 11a as a function of the temperature thereof.

Step f): consists of determining the primary winding temperature using a CoilTemp=g(Rp) correspondence curve, the calculated resistance RP1 giving, by correspondence, the temperature T1. The temperature of the primary winding 11 can be assimilated with the temperature of the entire coil 1 because the first and second windings 11 and 12 are fitted one inside the other.

Figure 5:
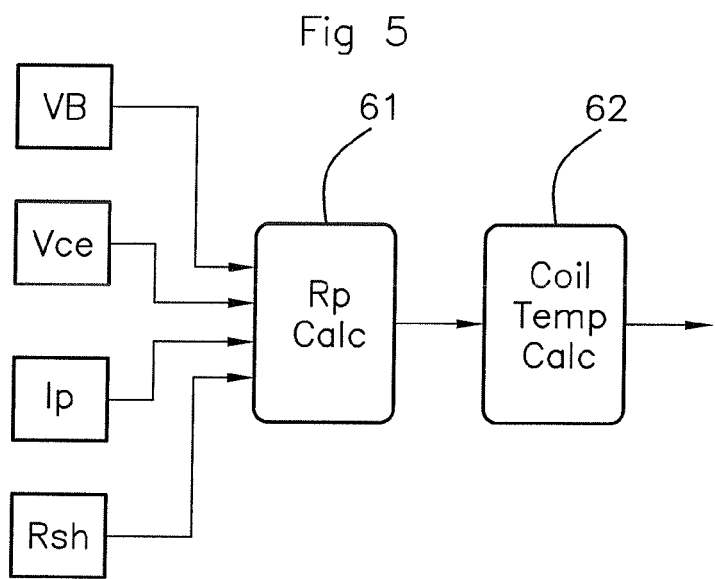
FIG. 5 shows a diagram of the method flow.

The method described above is illustrated in the form of a flow diagram in FIG. 5, where steps c) to e) are implemented in box 61 and the transformation described at step f) is implemented in box 62.

The method is not systematically applied at each ignition cycle, because depending upon the time allocated to generate the ignition spark, it is not necessarily possible to wait for the time needed for the primary current Ip to be stabilized 44. Moreover, the method requires the primary current to be controlled longer than necessary for a normal ignition; the use of the method should therefore be limited so that the coil and the control stage are not unnecessarily activated.

In the case of normal engine operation, the method is applied at most once per minute. Moreover, the recurrence of the method can be dependent on the rotation speed or other parameters such as the temperature of the cooling circuit.

Moreover, advantageously according to the invention, the method is applied following a periodicity which depends upon the phase of operation of the engine, e.g. a low load phase, a high load phase or even a fuel cut-off phase. In the case of injection cut-off (also called fuel cut-off), the method is applied with a periodicity with a period longer than one minute.

Figure 3:
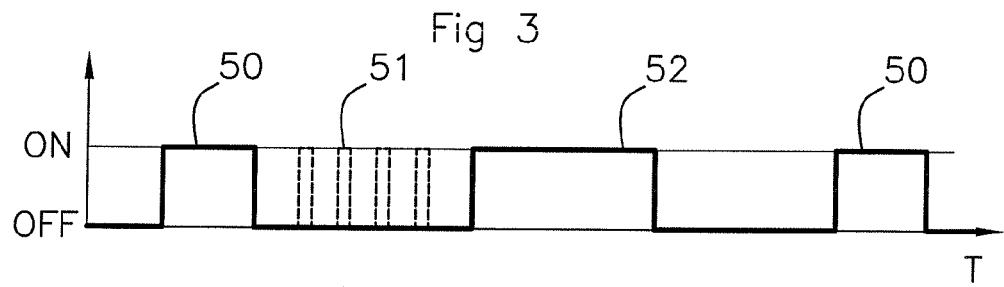
FIG. 3 shows a digital timing diagram for the control of the primary of the ignition coil.

In the case of multiple-spark explosion ignition, in reference to FIG. 3, the method is applied during phase 52 situated after the multiple sequence 51 which follows a normal ignition 50.

It should be noted that the method disclosed above can be applied to a classic two-output ignition coil, to a conventional static ignition coil or to so-called "pencil coils", each installed in the well area of the corresponding spark plug.

The output transistor or switch 6 has to be chosen so that the plateau current Ip at saturation 44 can be reached, and not be limited by the possible intrinsic current protection of said transistor.

Moreover, a person skilled in the art will be able to apply this method to each of the cylinders of an internal-combustion engine, each cylinder having a spark plug linked to an ignition coil, and the control unit having, for each of the ignition coils, a control stage connected to each of the ignition coils.

It should be noted that the foot resistance Rsh (reference 5) can be shared by two or more output switches 6, and in this case a person skilled in the art will make sure to avoid overlaps between the commands of the different switches connected to the same foot resistance Rsh (reference 5).

The invention is also suitable for a particular configuration where two ignition coils are connected in series via the primary windings thereof, and therefore simultaneously controlled by the switch 6 of the control unit 90. In this configuration, the two coils (called first and second) each generate a spark at the moment of the interruption of the primary current Ip, and one of these two sparks is called "lost", but this makes it possible to use only one control stage for two cylinders.

In this configuration, with two identical coils, the control stage "sees" the two primary windings in series, and thus an inductance equal to Lp'=2×Lp and a resistance equal to Rp'=2×Rp. All of the above formulae and equations apply, mutatis mutandis, by replacing Rp by Rp'. This configuration applies in particular to the case of pencil coils situated near to the plug spark in the upper zone of the cylinder head.

In these conditions, it is reasonable to assume that the temperatures of the two coils are very close.

The value Rp' can then be divided by two for finding the value relative to a coil, and then the CoilTemp=g(Rp) characteristic curve in FIG. 2 is used to deduce the temperature thereof.

Alternatively, a CoilTemp=g'(Rp') curve can also be characterized for two coils in series, and then the temperature deduced directly from the double resistance Rp'.

The invention claimed is:

1. A method for determining the temperature of at least one engine ignition coil (1) for a motor vehicle, said coil comprising a primary winding (11) with a winding resistance (Rp) and an inductance (Lp), said primary winding being controlled by a control stage (2) with a switch (6) and a foot resistance (Rsh), the method comprising the following steps:
   a) controlling the control stage (2) in order to establish a primary control current (Ip) across said primary winding under a supply voltage VB, b) waiting for a predetermined time;
   c) determining the primary current Ip (4) by measuring the voltage (Vshunt) at the terminals of the foot resistance and by dividing this voltage by the resistance Rsh of the foot resistance;
   d) acquiring the value of the supply voltage VB and the voltage Vce to the terminals of the switch;
   e) determining the winding resistance Rp using the formula:

$$Rp = \frac{VB - Vce}{Ip} - Rsh$$

f) determining the temperature of the primary winding using a temperature-resistance (CoilTemp =g(Rp)) correspondence curve.

2. The method as claimed in claim 1, in which step d) comprises a step of actual measurement of the value of the supply voltage VB.

3. The method as claimed in claim 1, in which during step b), the predetermined time is a function of the voltage VB.

4. The method as claimed in claim 2, in which during step b), the predetermined time is, in addition, a function of the temperature of the coil established beforehand.

5. The method as claimed in claim 1, in which said method is applied at most once per minute.

6. The method as claimed in claim 1, in which said method is applied following a periodicity depending upon the phase of operation of the engine.

7. The method as claimed in claim 6, in which during an injection cut-off phase, the method is applied following a periodicity with a period longer than one minute.

8. The method as claimed in claim 1, in which the method is consecutively applied to a multiple-spark explosion ignition sequence (S1).

9. A control unit (90) suitable for controlling at least one engine ignition coil (1) of a motor vehicle, said coil comprising a primary winding (11), the control unit comprising a control stage (2) with a switch (6) and a foot resistance (Rsh), the control unit being suitable for implementing the method as claimed in claim 1.

10. The control unit (90) as claimed in claim 9, suitable for controlling two ignition coils connected in series.

11. The method as claimed in claim 2, in which during step b), the predetermined time is a function of the voltage VB.

* * * * *